US012781689B2

(12) United States Patent
Sebo

(10) Patent No.: US 12,781,689 B2
(45) Date of Patent: Nov. 3, 2026

(54) INJECTOR FOR A ROCKET ENGINE

(71) Applicant: GATE SPACE INNOVATION GMBH, Wien-Flughafen (AT)

(72) Inventor: Alexander Sebo, Vienna (AT)

(73) Assignee: GATE SPACE INNOVATION GMBH, Wien-Flughafen (AT)

(*) Notice: Subject to any disclaimer, the term of this patent is extended or adjusted under 35 U.S.C. 154(b) by 109 days.

(21) Appl. No.: 18/879,903

(22) PCT Filed: Jul. 5, 2023

(86) PCT No.: PCT/EP2023/068510
§ 371 (c)(1),
(2) Date: Dec. 30, 2024

(87) PCT Pub. No.: WO2024/008781
PCT Pub. Date: Jan. 11, 2024

(65) Prior Publication Data

US 2025/0382929 A1 Dec. 18, 2025

(30) Foreign Application Priority Data

Jul. 7, 2022 (DE) ..................... 10 2022 117 016.0

(51) Int. Cl.
*F02K 9/52* (2006.01)
*F02K 9/58* (2006.01)
*F02K 9/64* (2006.01)

(52) U.S. Cl.
CPC .................. *F02K 9/52* (2013.01); *F02K 9/58* (2013.01); *F02K 9/64* (2013.01); *F05D 2260/201* (2013.01)

(58) Field of Classification Search
CPC ..... F02K 9/52; F02K 9/56; F02K 9/58; F02K 9/62; F02K 9/64; F05D 2270/306
See application file for complete search history.

(56) References Cited

U.S. PATENT DOCUMENTS 3,094,838 A 6/1963 Evans
3,205,656 A 9/1965 Elverum, Jr.
(Continued)

FOREIGN PATENT DOCUMENTS

| | | |
|---|---|---|
| CN | 114562389 A | 5/2022 |
| DE | 1301932 B | 8/1969 |
| GB | 2092271 A | 8/1982 |

OTHER PUBLICATIONS

International Search Report mailed on Oct. 10, 2023, issued in International Application No. PCT/EP2023/068510, filed on Jul. 5, 2023; 3 pages.

(Continued)

*Primary Examiner* — Scott J Walthour
(74) *Attorney, Agent, or Firm* — CHRISTENSEN O'CONNOR JOHNSON KINDNESS PLLC

(57) ABSTRACT

An injector for a rocket engine includes a base body in which a fuel supply and an oxidant supply are provided, and a setting element which, in cooperation with the base body, defines both a throttle point in the fuel supply and a throttle point in the oxidant supply. The setting element is adjustable relative to the base body. The throttle points are configured such that, during operation, the fuel and the oxidant each flow through the narrowest cross-section of the throttle points at the speed of sound.

5 Claims, 16 Drawing Sheets

(56) References Cited

U.S. PATENT DOCUMENTS

| | | | | | |
|---|---|---|---|---|---|
| 3,234,731 | A * | 2/1966 | Dermody | .................. | F02K 9/52<br>60/741 |
| 3,462,950 | A | 8/1969 | Chevalaz | | |
| 3,527,056 | A | 9/1970 | Hoffman | | |
| 3,534,909 | A | 10/1970 | Rosales et al. | | |
| 3,848,806 | A | 11/1974 | Samuelsen et al. | | |
| 3,863,442 | A | 2/1975 | Schmidt et al. | | |
| 4,782,660 | A | 11/1988 | Domyan et al. | | |
| 2021/0363939 | A1 | 11/2021 | Holder et al. | | |

OTHER PUBLICATIONS

Written Opinion of the International Searching Authority mailed on Oct. 10, 2023, issued in International Application No. PCT/EP2023/068510, filed on Jul. 5, 2023; 3 pages.

* cited by examiner a)

b)

c)

INJECTOR FOR A ROCKET ENGINE

The invention relates to an injector for a rocket engine.

Thrust control of rocket engines is a complex process due to the nonlinearity and coupling of fluid-mechanical and thermodynamic processes during injection and combustion. Four parameters must be monitored for optimal thrust control in the engine: mass flow of the fuel, mass flow of the oxidant, injection speed of the fuel and injection speed of the oxidant. While the total mass flow must be varied for thrust control, both the mixture ratio and the injection speeds must be kept as constant as possible for optimal performance. This problem is further complicated by the fact that all four parameters are coupled via the pressure of the combustion chamber. This sometimes leads to feedbacks and oscillations, which complicate control and, in the worst case, may cause destruction of the engine.

In most existing systems, mass flow control takes place via two separate control valves. They throttle the mass flows to the desired value. With constant injection geometry, this means a change in the injection speeds. Such systems are limited in the control range and accept the resulting power loss. The control valves usually work according to the throttle principle; the flow rate thus depends on the pressure difference. Systems which partially rely on the cavitation principle are also know; they are therefore partially pressure-decoupled. In the state of the art, the control valves are respectively designed as separate components.

One approach for continuously controlling the injection speed is the "variable area injector". Here, the size of the injection openings is continuously changed. In previous designs, this approach has been limited to injectors including individual elements (in particular pintle injectors, occasionally continuous impingement injectors). Here, the cross-sectional change is usually achieved by axially displacing two concentric conical surfaces. The concept is used, for example, in the Merlin engine from SpaceX or the LMDE engine from the Apollo program (Lunar Module Descent Engine). In variable pintle injectors, due to existing proportionalities, both injection openings are adjusted via a single controlled parameter and are therefore no longer independent. In addition, in this method, the injector geometry can be used as a shut-off valve (face shut-off). This is usually achieved by metallic sealing surfaces.

Document U.S. Pat. No. 4,782,660 discloses a fuel injector in which coupled constrictions for the oxidant and the fuel for throttling the fluids and thus coupled injection openings are present. The throttle points are not operated in the cavitation range, so that the mass flow depends on the combustion chamber pressure. Changes in the combustion chamber pressure therefore have an undesirable effect on the mass flow.

An injector which cannot be controlled is known from document CN 114562389. Here, the injection takes place directly from a recovery diffuser.

Document US 2021/363939 A1 discloses an injector which has two sliders which are not fixedly coupled to each other and by means of which the supply of oxidant and fuel when the engine starts is controlled. Thrust control with the disclosed design is not possible. In addition, a geometry is used which is not suitable for cavitation operation.

The object of the invention is to create an injector for a rocket engine which has a simple structure and can be reliably controlled over almost the entire operating range thereof.

According to the invention, to achieve this object, an injector for a rocket engine is provided, comprising a base body in which a fuel supply and an oxidant supply are provided, and a setting element which, in cooperation with the base body, defines both a throttle point in the fuel supply and a throttle point in the oxidant supply, wherein the setting element is adjustable relative to the base body and wherein the throttle points are configured such that, during operation, the fuel and the oxidant each flow through the narrowest cross-section of the throttle points at the speed of sound.

The basic idea of the injector according to the invention is based on the principle of the "variable area injector", which is operated in the so-called "choked flow", i.e. in a state in which the flow in the narrowest cross-section of the throttle point has the speed of sound. This principle may be used for both pressure-liquefied fluids and normal fluids.

If compressible fluids (gases, gas-liquid two-phase mixtures) are guided through an opening and the pressure difference is increased by lowering the back pressure (i.e. the pressure behind the cross-section in question), the flow velocity and thus the mass flow will continue to increase until the fluid reaches the speed of sound (critical pressure ratio). A further increase in velocity in the narrowest flow cross-section is not possible by further lowering the back pressure. The outflowing amount of gas is only dependent on the narrowest flow cross-section, the initial pressure and the thermodynamic properties of the gas upstream of the nozzle. As long the critical pressure ratio is not undershot, the mass flows are not influenced by the back pressure. This condition is referred to as "choked flow". A hypothetical injector having this form of injection would not show any coupling of the mass flows with the combustion chamber pressure. The mass flows are therefore no longer related to the state in the combustion chamber and are completely decoupled from a control engineering point of view.

In principle, operation with choked flow is also conceivable for gaseous fuels. However, due to their low density, gaseous fuels are not suitable for rocket engines. In addition, the supersonic injection makes stable combustion more difficult. In contrast thereto, liquid fuels are much better suited as they do not have the disadvantages of gaseous fuels. While pressure and velocity cannot change abruptly at a given location in normal subsonic flows, this is possible in flows at or above the speed of sound (compression/thinning shock).

However, liquids can be caused to evaporate by sufficiently lowering the pressure. The vaporization pressure depends on the state and type of the fluid and occurs almost instantaneously when the pressure is lowered. The gas content continues to increase as the pressure is further lowered, as does the flow velocity. Two-phase mixtures of gas and liquid have a significantly lower speed of sound than the corresponding single-phase flows, as a result of which the "choked flow" can also be achieved if the pressure is reduced sufficiently. Analogous to the "choked flow" in single-phase flows, this is referred to as "two-phase choked flow". The resulting mass flow is, like the pure gas, decoupled from the pressure after the opening. The influence of the initial pressure is significantly lower than in a purely gaseous medium. This effect is particularly useful for injectors for rocket engines.

The particular advantage of the injector according to the invention is that it can be controlled very easily. Considering the four controlled parameters total mass flow, mixture ratio, fuel injection speed and oxidant injection speed, only the total mass flow is varied during operation, while the remaining parameters are fixed by design specifications. If the injector is operated such that cavitation occurs in the narrowest cross-section in the "two-phase choked flow", and the initial conditions are kept constant, all parameters are, in a first approximation, only linear functions of the geometry, in particular of the flow cross-sections. There are certain nonlinearities due to friction effects and swirling effects; however, these have only a minor impact.

The design of the injectors according to the invention, which can be operated in a state of cavitation due to their design, constitutes a significant difference to the prior art.

The term "rocket engine" is here not limited to a propulsion system for a rocket in the proper sense, i.e. for the purpose of leaving the gravitational field of the earth. It refers to any propulsion system which operates by expelling combustion gases, even in a vacuum, for example for the purpose of controlling the position of satellites.

According to one embodiment of the invention, it is provided that the throttle point coincides with the injection opening. This is advantageous when the vapor pressure of the liquids used as fuel and oxidant is higher than the combustion chamber pressure. Examples of such liquids are nitrous oxide, ethane, propane, propylene or ethylene.

The fluids are injected directly from the narrowest cross-section at the critical speed of sound thereof. Since the latter is significantly lower than that of pure gas due to the properties of two-phase flows, a stable combustion is achieved.

In principle, it is conceivable to provide separate injection openings to reduce the speed. However, the speeds would again depend on the pressure in the combustion chamber due to the compressibility of the gas component, so that separate injection openings are preferably avoided.

Preferably, the setting element or the base body is configured with slots in the area of the throttle points, the position of the setting element relative to the base body determining the flow cross-section at the throttle points. By covering the slots in the setting element or the base body with the structure of the base body or the setting element, the flow cross-section as a whole can be adjusted very precisely.

According to one embodiment, it is provided that the setting element, at the injection-side end thereof, is configured as a hollow cylinder which is provided with slots arranged in pairs on the side of the fuel supply and on the side of the oxidant supply side. This results in advantageous geometric conditions.

The hollow cylinder may be guided in the combustion-chamber-side end of the base body, preferably by means of a seal. This ensures that the flow cross-sections are maintained very precisely. In particular, it is ensured that the mixture ratio of fuel to oxidant is always constant and does not vary due to radial position tolerances.

According to one embodiment, it is provided that the setting element is provided with seals which may cooperate with a resting surface in the base body in the axial direction such that the fuel supply and the oxidant supply are shut off. The axial sealing effect may be used to reliably shut off the fuel and oxidant supply, so that when the engine is shut down, no fuel and no oxidant are wasted and when restarted, a stable injection state is immediately obtained as the injector is already filled with fuel and oxidant.

According to one variant embodiment, it is provided that a pressure recovery portion is provided in the supply of the fuel and/or the oxidant downstream of the throttle point, and the injection opening is arranged downstream of the pressure recovery section. This variant embodiment is used for liquids the vapor pressure of which is below the combustion chamber pressure (e.g. liquid oxygen, hydrogen peroxide, methane, liquid hydrogen, ethanol, etc.). In this case, the "choked flow" must be produced in a cavitation venturi. Similar to a venturi tube, the liquid is accelerated by narrowing the cross-section. The pressure thus drops below the vapor pressure. Cavitation and the choked flow occur in the narrowest cross-section. The fluid then flows through the pressure recovery portion, in which the flow cross-section continuously increases. This slows down the fluid again, and the pressure rises back to the combustion chamber level. Finally, the fluid is injected into the combustion chamber through separate injection openings. The cavitation venturis and the injection openings for the oxidant and the fuel are geometrically coupled to each other and can all be varied using a single controlled parameter.

In this variant embodiment, the injection speed can also be monitored solely by the size of the injection opening due to the incompressibility of the fluid and the cavitation venturi provided upstream. The resulting pressure and speed curve is not continuous with the curves prior to the venturi.

The injector may be configured as a pintle injector, so that the geometry of the nozzle pintle may influence the way the fuel and the oxidant are mixed.

The pressures in the fuel and oxidant system exert forces on the setting element. These forces may be compensated for by adequately dimensioning the effective cross-sections in the axial direction. The injector surface is exposed to the combustion chamber pressure and cannot be compensated for by the pressure in the fluid system due to the variable combustion chamber pressure. However, the combustion chamber pressure is almost linearly related to the position of the setting element. To compensate for the pressure forces, a linear pressure spring is therefore used, which is compressed when the setting element opens and applies a counterforce directly proportional to the combustion chamber pressure to the setting element. The actuator is thus force-free in the first approximation and must only overcome deviations from the ideal state and friction in the sealing points.

The above-mentioned object is also achieved by an injector of the type explained above in combination with a combustion chamber. With regard to the resulting advantages, reference is made to the explanations above.

Part of the fuel and/or oxidant injected into the combustion chamber may impinge on the combustion chamber wall such that it is cooled. A good control of the mechanical loads on the combustion chamber wall is thus possible.

The invention will now be described on the basis of various embodiments, which are illustrated in the accompanying drawings, in which.

Figure 11:
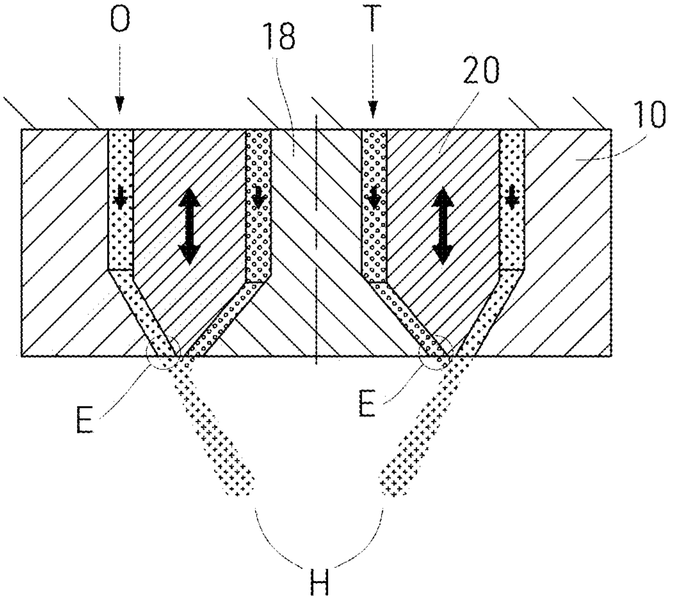
Figure 12:
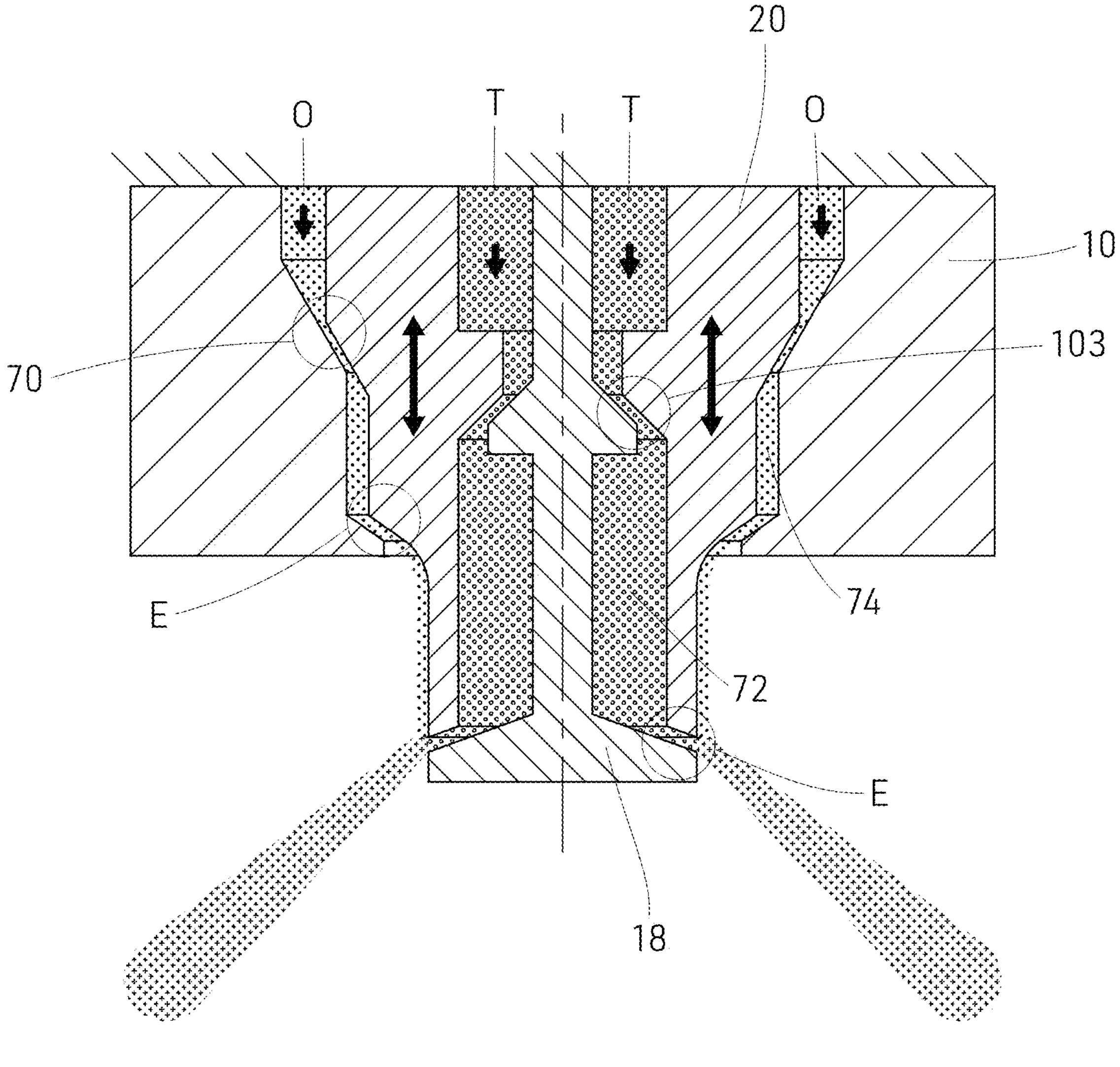
Figures 14, 15:
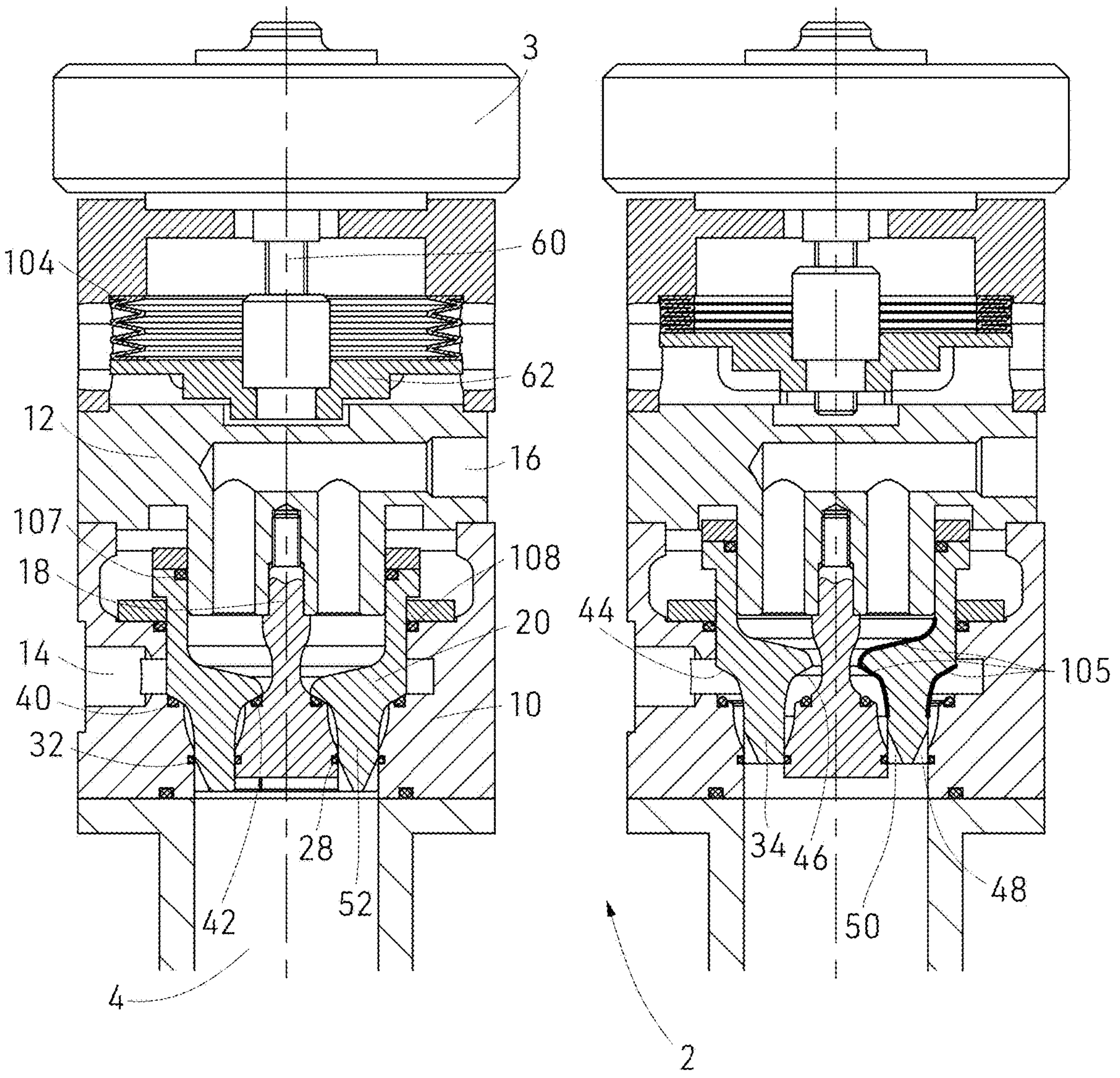
Figure 16:
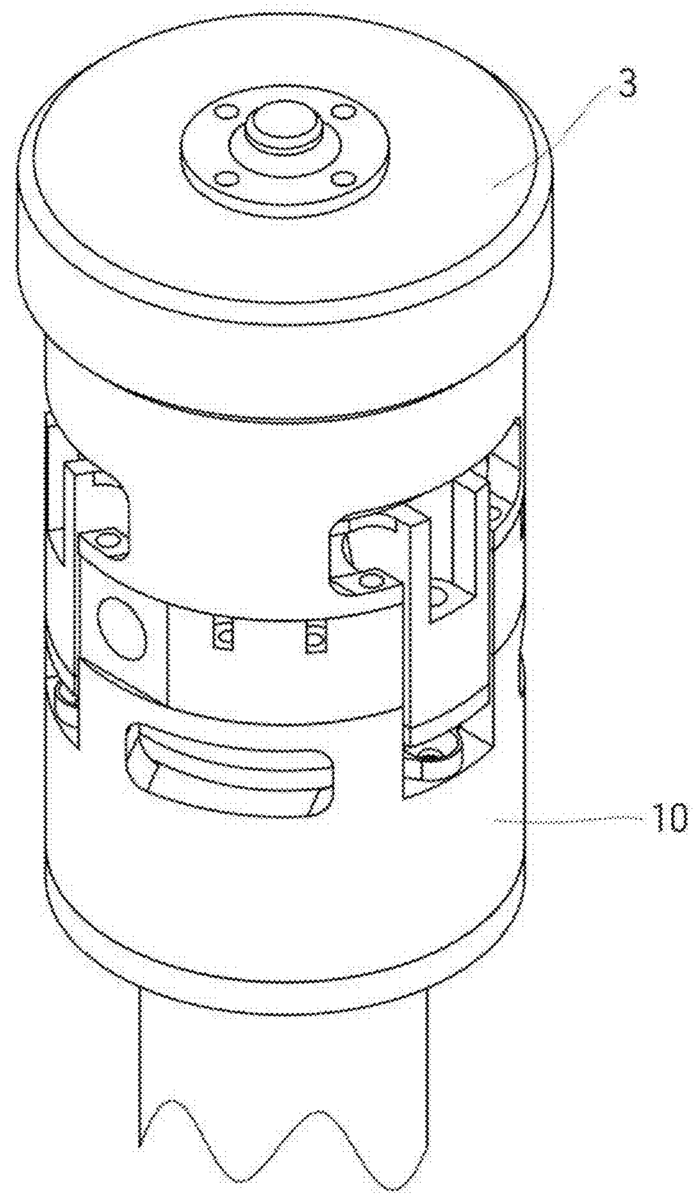

FIGS. 10*a* to 10*f* show various injection configurations which may be used with the injector of FIGS. 2 to 7;

FIG. 11 schematically shows a variant embodiment of the injector of FIGS. 2 to 7;

FIG. 12 schematically shows an injector according to a second embodiment;

FIGS. 13*a* to 13*c* show an injector of the second embodiment in a cross-section, the pintle of the injector in a side view and a section through the pintle;

FIG. 14 shows in section an injector according to a further embodiment, the injector being shown in the closed state;

FIG. 15 shows the injector of FIG. 14 in the open state;

FIG. 16 shows the injector of FIG. 14 in a perspective view; and

Figure 17:
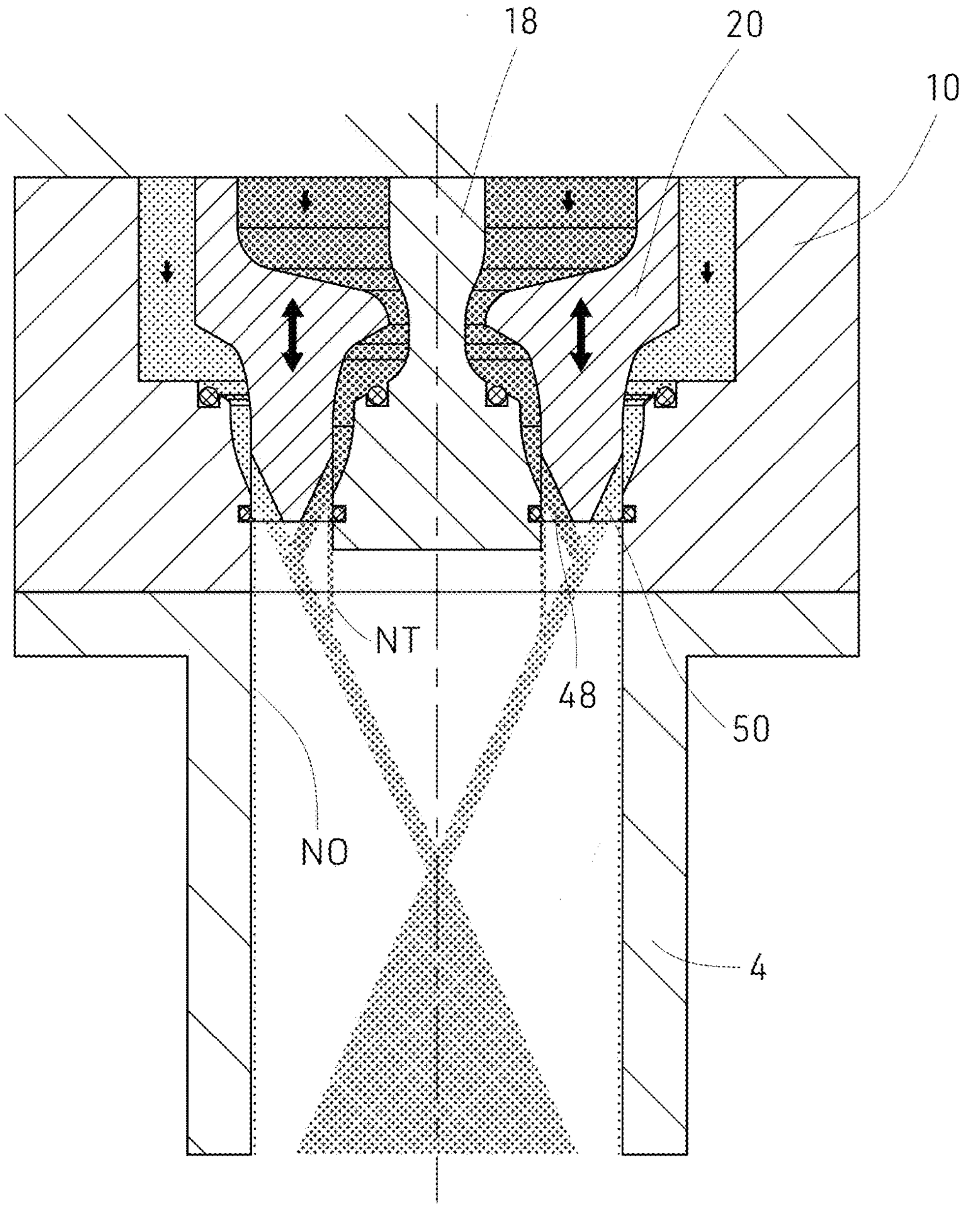

FIG. 17 shows the flow conditions occurring during operation of the injector of FIGS. 14 to 16.

Figure 1:
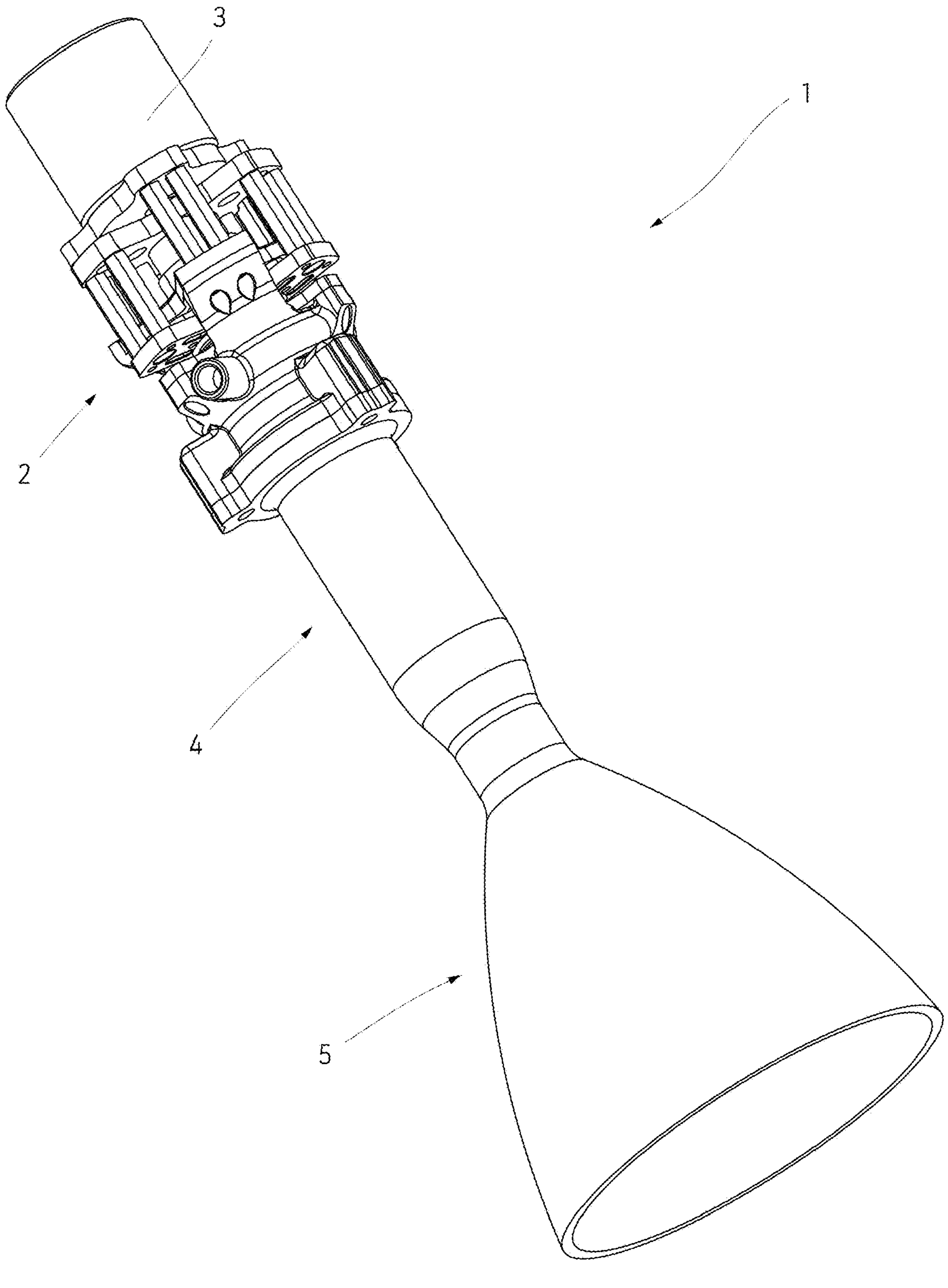
FIG. 1 shows in a schematic view a rocket engine with an injector according to the invention.
Figure 2:
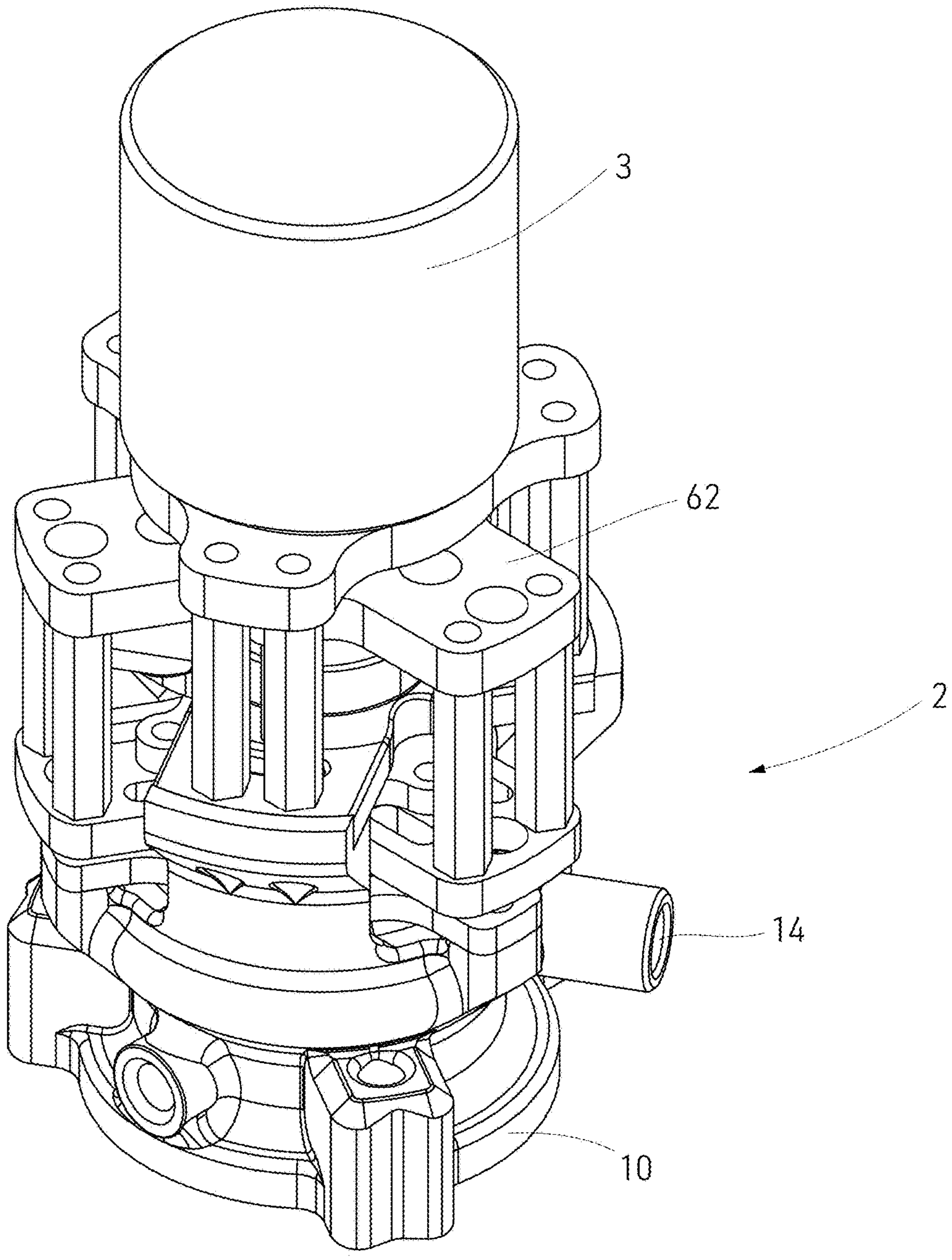
FIG. 2 shows in a perspective view the injector according to a first embodiment.
Figure 3:
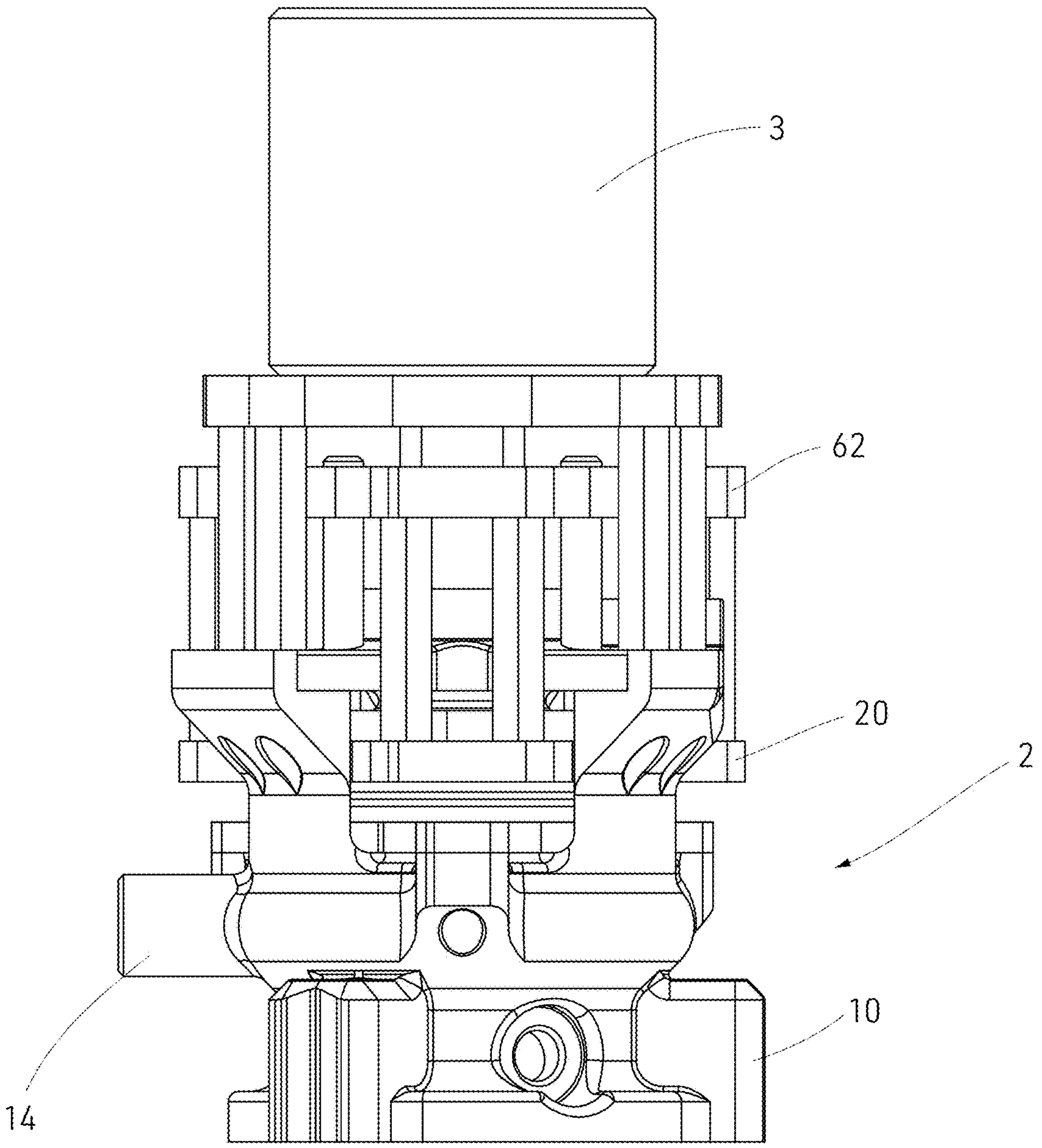
FIG. 3 shows the injector of FIG. 2 in a side view.

FIG. 1 schematically shows a rocket engine 1. It has an injector 2 by means of which a fuel and an oxidant can be injected into a combustion chamber 4. The combustion gases leave the rocket engine 1 through a nozzle 5.

The injector 2 is shown in detail in FIGS. 2 to 7.

The injector has a two-part base body 10, 12. The part 10 of the base body is used for attachment to the combustion chamber and has an oxidant supply 14. The part 12 of the base body is used to connect an actuator 3 and has a fuel supply 16.

The injector according to the first embodiment is configured for pressure-liquefied liquids the vapor pressure of which is above the combustion chamber pressure. Examples are nitrous oxide, ethane, propane, propylene and ethylene.

The part 12 of the base body of the injector 2 is provided with a guide 18 which is arranged concentrically to a center axis M of the injector 2. In general terms, the guide 18 defines a radially inner valve seat, while the part 10 of the base body 10, 12 defines a radially outer valve seat. A setting element 20, which is displaceable in the axial direction in the base body 10, 12, cooperates with these two valve seats. In a closed position of the setting element, the injection cross-section for the fuel and the oxidant is closed, and in open positions of the setting element, the injection cross-section for the fuel and the oxidant is opened to a greater or lesser extent depending on the axial position.

The guide 18 has a combustion chamber-side guide ring 22 and an adjoining spacer 24, which are attached in the part 12 of the base body 10, 12 by means of a screw bolt 26. The outer surface of the guide ring 22 and the adjoining area of the spacer 24 together form a radially inner guide surface 25 (see FIG. 7).

An annular seal 28 is arranged between the guide ring 22 and the spacer 24.

Approximately at the level of the guide ring 22, the part 10 of the base body 10, 12 is provided with a guide surface 30, which is arranged concentrically to the center axis M of the injector 2. An annular seal 32 is arranged in the guide surface 30.

At its combustion chamber-side end, the setting element 20 is configured with a hollow cylindrical portion 34, which is guided on the outside by the guide surface 30 and on the inside by the guide surface 25. The seals 28, 32 ensure that the guiding effect is maintained even if not extremely close tolerances are observed in the cooperating components.

On the side facing away from the combustion chamber, the hollow cylindrical portion 34 of the setting element 20 is adjoined by a radially outer shoulder 36 and a radially inner shoulder 38. They respectively form a seat for an annular seal 40 or 42.

When the setting element 20 is in the closed position, the seal 40 rests against a conical resting surface 44 of the part 10 of the base body 10, 12. When the setting element 20 is in the closed position, the seal 42 rests against a conical surface 46 formed on the spacer 24.

The material for the seals 28, 32, 40, 42 can be TEFLON or a metallic material.

Figure 4:
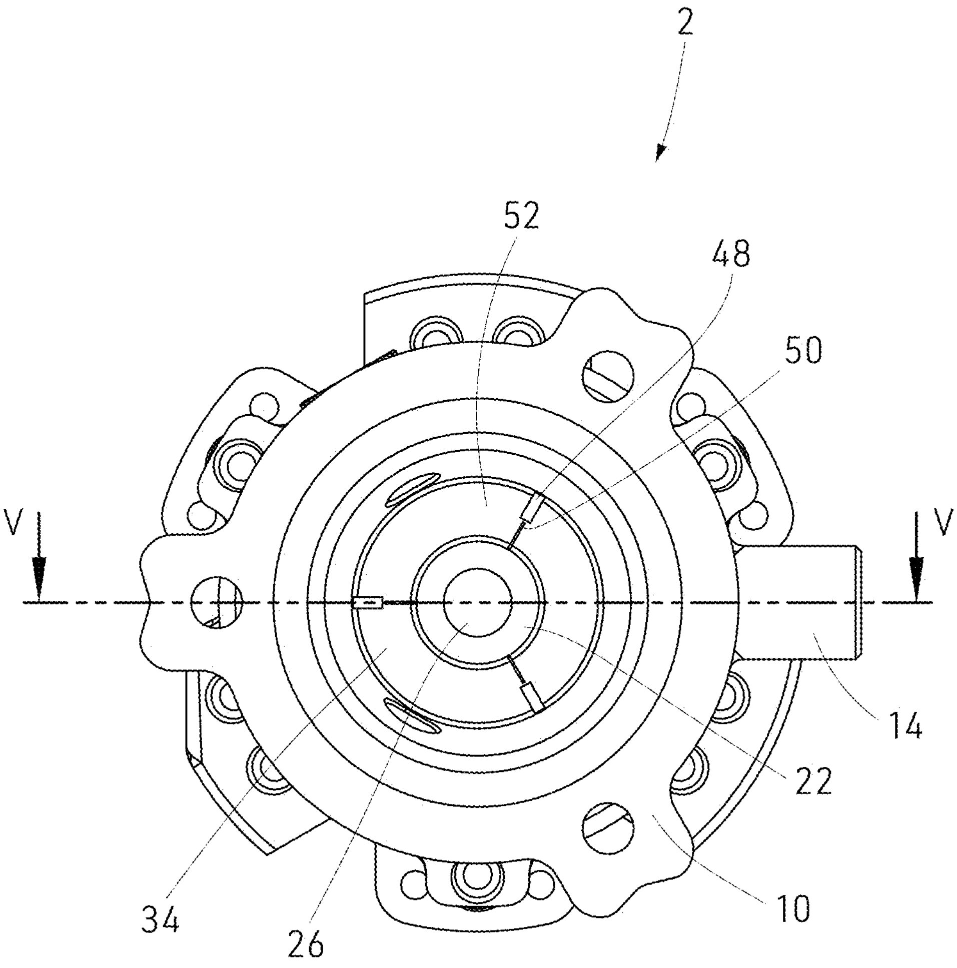
FIG. 4 shows the injector of FIG. 2 in a view from the combustion chamber.
Figure 5:
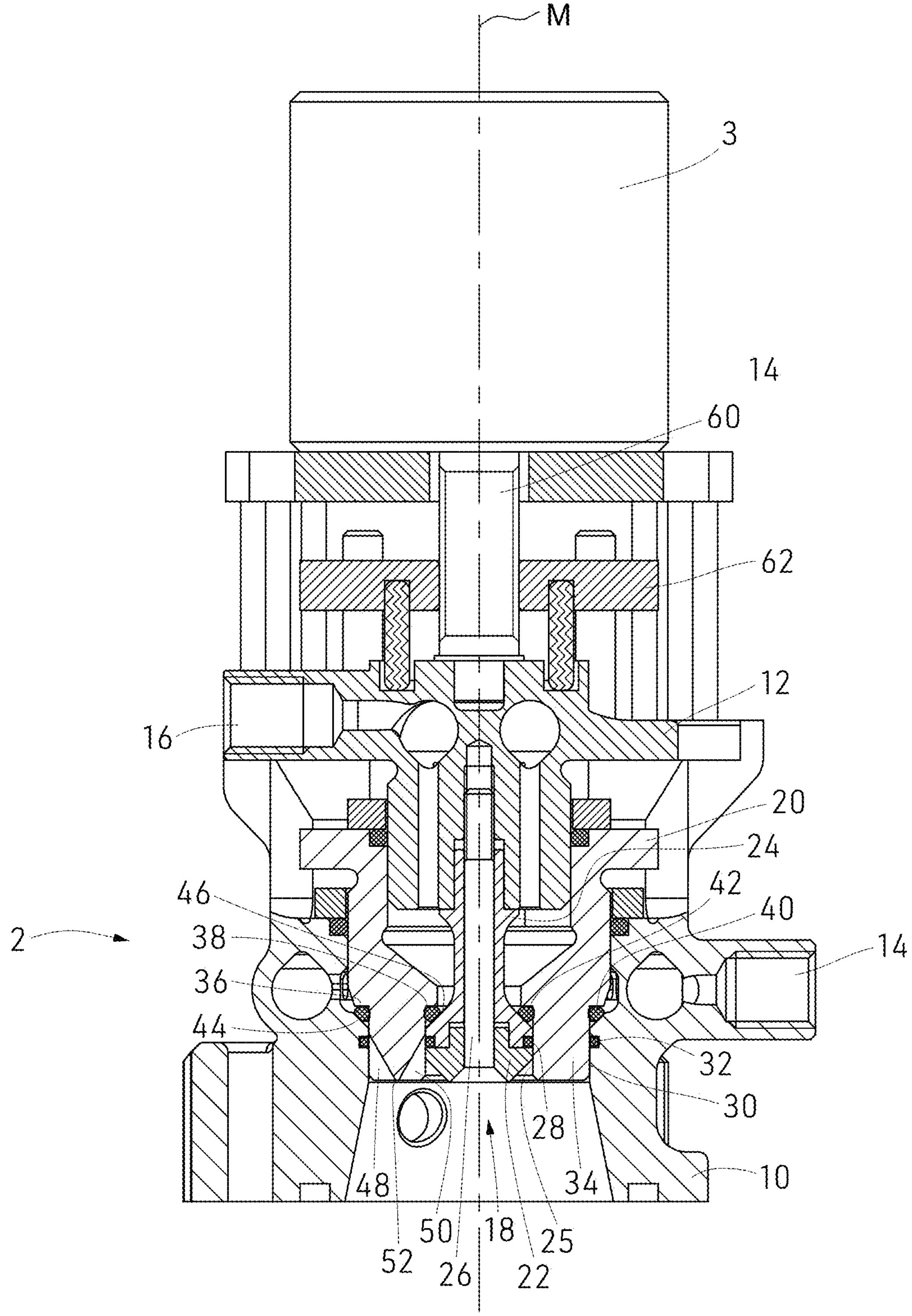
FIG. 5 shows a section along the plane V-V of FIG. 4, the injector being in a closed state.

As can be seen in particular in FIG. 4 in combination with FIG. 5, the hollow cylindrical portion 34 of the setting element 20 is provided on the side of the combustion chamber with slots arranged in pairs, namely with radially outer slots 48 and with radially inner slots 50.

The slots 48, 50 have the maximum depth at the combustion chamber-side end of the portion 34 of the setting element 20, as measured in the radial direction, so that they meet at a tip 52 there. With increasing axial distance from this tip 52, the depth of the slots 48, 50 decreases until they finally both run out at the same level. In the closed state of the setting element 20, the slots 48, 50 run out within the guide portion, which is formed by the guide surface 30 in the part 10 of the base body of the injector and the guide surface 25 of the guide 18.

The axial position of the setting element 20 is adjusted by means of the actuator 3, which works electromechanically. In the example embodiment shown, the rotary motion of a spindle 60 is transmitted to a setting movement of a plate 62, which in turn is coupled to the setting element 20.

When the setting element 20 is in the closed position (see FIG. 5), the rest of the seals 40, 42 on the conical resting surfaces 44, 46 ensures that neither fuel nor oxidant can enter the combustion chamber ("face shutoff").

Figure 6:
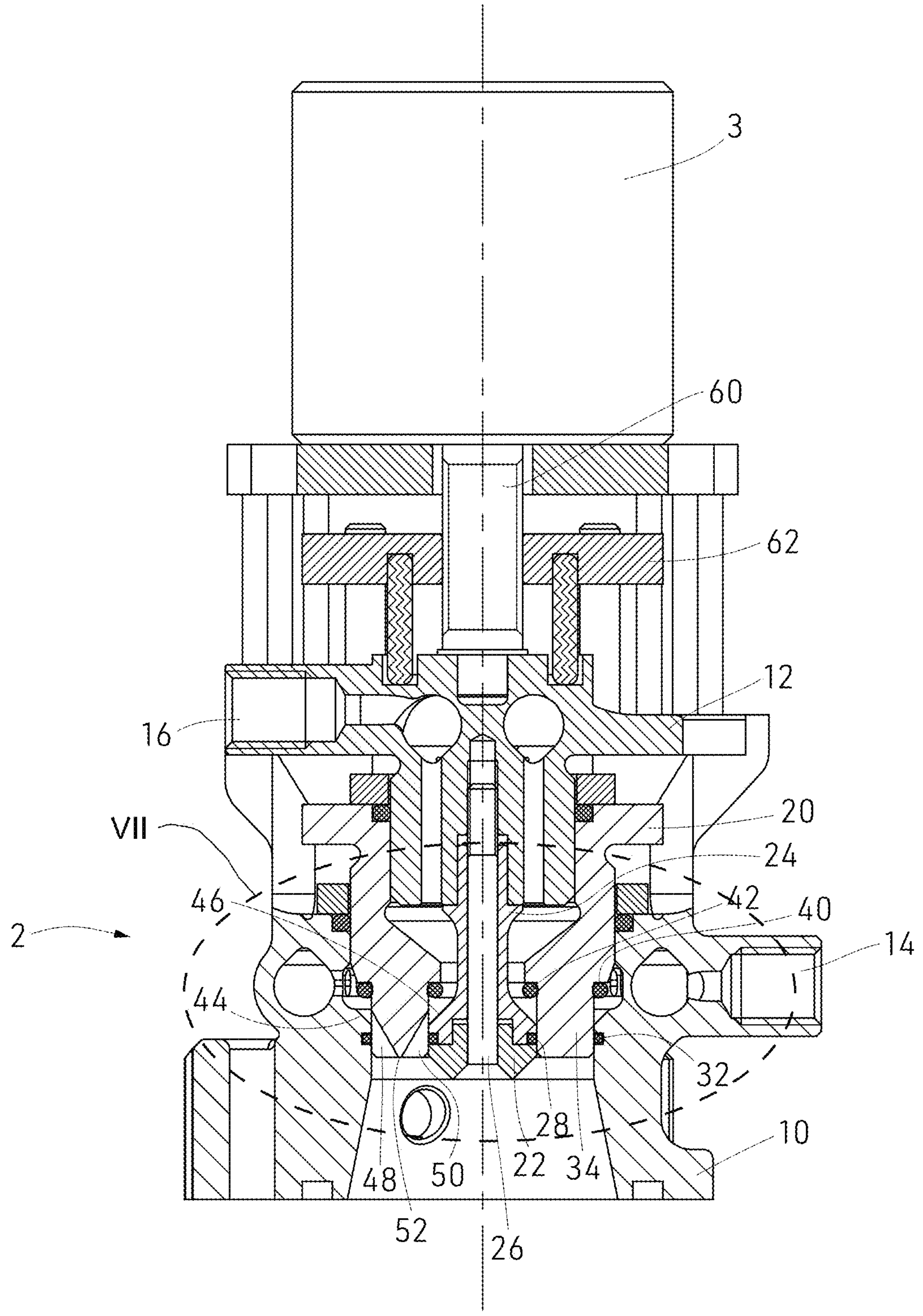
FIG. 6 shows the injector of FIG. 5, the injector being in an open state.

When the setting element is moved from the closed position to an open position, as shown in FIG. 6, for example, the seals 40, 42 first lift off the resting surfaces 44, 46. At this instant, however, the slots 48, 50 are still completely within the guide surfaces 25, 30, so that (assuming accordingly narrow tolerances) neither fuel nor oxidant can enter the combustion chamber. Only when the setting element 20 is retracted so far that the beginning of the slots 48, 50 is located above the transition of the guide surfaces 25, 30 into the conical resting surfaces 46, 44, is a flow cross-section for the fuel and the oxidant released in the area of the slots. They then flow through the slots 48, 50 into the combustion chamber in accordance with the specified geometry.

Figure 7:
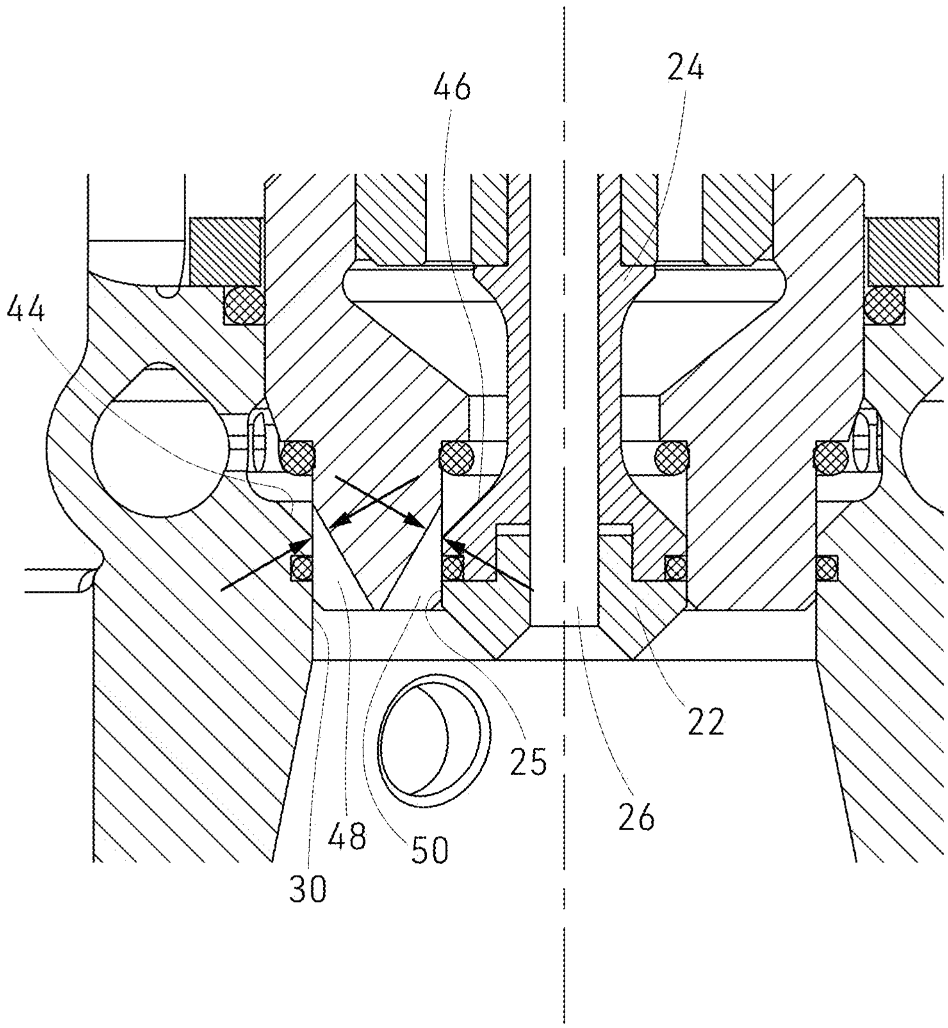
FIG. 7 shows in an enlarged scale the detail VII of FIG. 6.

The resulting narrowest flow cross-section for the fuel and the oxidant is marked by arrows in FIG. 7.

The geometric conditions are adapted such that cavitation occurs here during operation of the injector and the speed of sound is reached in the narrowest flow cross-section. Thus, the injection speed is constant, and the mass flow (in a first approximation) depends directly on the cross-section of the cavitation venturi and the injection opening. The entire injector can thus be controlled by means of a single parameter, namely the position of the setting element 20 and thus the flow cross-section at the narrowest point.

The mixture ratio is determined exclusively and invariably by the ratio of the cross-sections for the injection of the fuel and the oxidant, i.e. by the cross-sections of the slots 48, 50 relative to each other. The injection speed is obtained from the speed of sound in the narrowest cross-section, the speed of sound being comparatively low because a mixture of liquid and gas is present in the narrowest cross-section, a so-called "two-phase choked flow".

Figure 8:
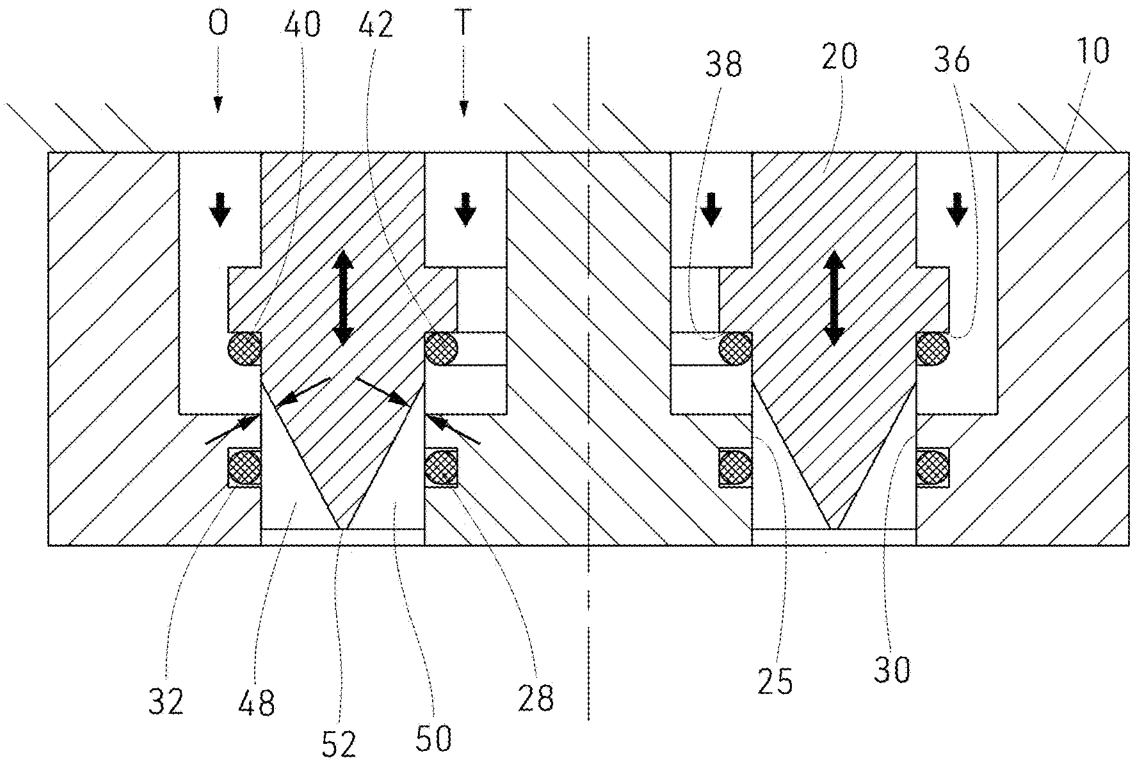
FIG. 8 shows a conceptual representation of the cooperation of the setting element and the base body.

FIG. 8 schematically shows the cooperation of the hollow cylindrical portion 34 of the setting element 20 with the inner guide surface 25 and the outer guide surface 30. On the left side, the narrowest flow cross-section for the fuel T and the oxidant O is again marked with thick arrows. For clarity, the section is placed here so as to pass through a pair of slots 48, 50 on both the right and the left side of the hollow cylindrical portion 34.

Figure 9:
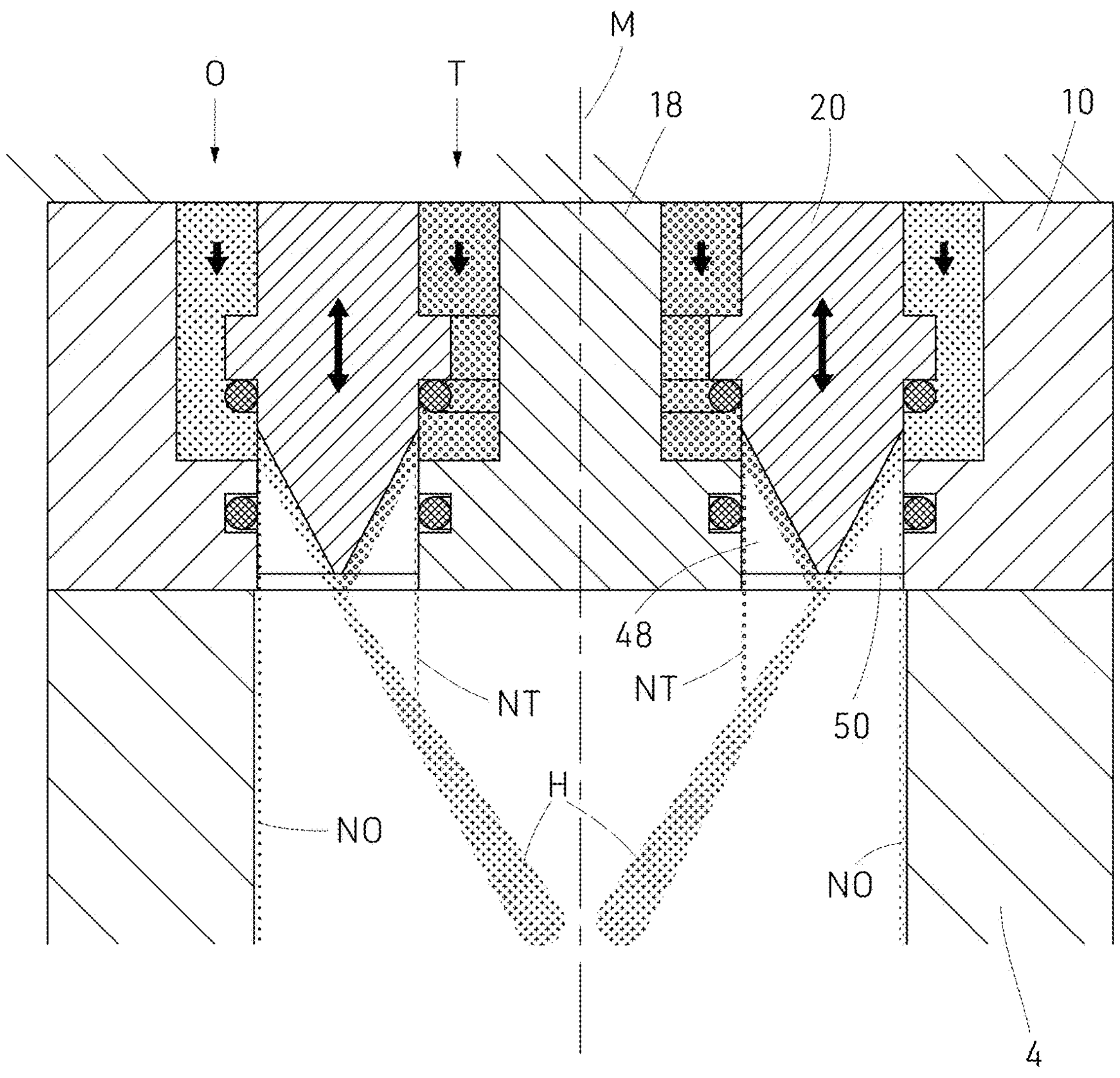
FIG. 9 shows in a schematic representation the flow conditions occurring during injection.
Figure 10:
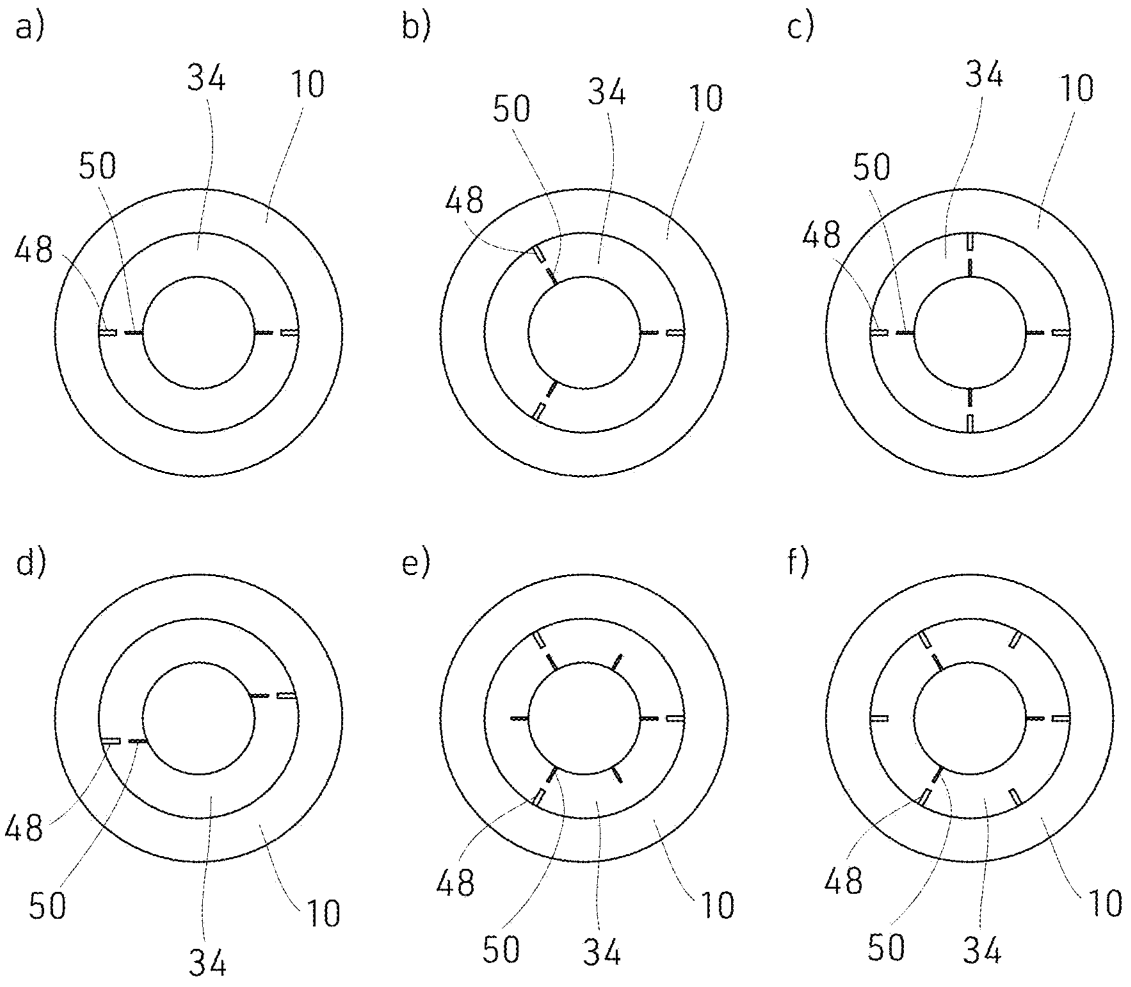

The flow pattern resulting during operation is shown schematically in FIG. 9.

FIG. 9 schematically shows the injection geometry of the injector of FIGS. 2 to 7.

The combination of the injection jets of the injected fuel T and the injected oxidant O results in main injection jets, which are designated here by the reference numeral H. The oxidant flowing through the outer slots 50 results in secondary jets on the outside, which are designated here with the reference numeral No. These secondary jets lead to a limited film cooling effect, which cools the transition region between the injector and the combustion chamber. This is particularly important for radiation-cooled combustion chambers.

In the same way, secondary jets NT are formed at the slots 48 for the fuel T, these forming a fuel-rich zone with a comparatively low temperature along the guide 18, so that the guide is protected from overheating.

The arrangement of the slots 48, 50 allows different injection patterns to be realized. It must be emphasized that different injection patterns are possible simply by exchanging the setting element 20 while leaving the injector otherwise unchanged. This is explained below with reference to FIG. 10.

FIG. 10*a* shows two slot pairs 48, 50 which are arranged in pairs diametrically opposite each other.

FIG. 10*b* shows the slot pattern of the injector shown in FIGS. 2 to 7.

FIG. 10*c* uses four slot pairs 48, 50 arranged at an angle of 90° to each other.

FIG. 10*d* shows slot pairs 48, 50 which are not aligned radially but have a tangential component, so that swirling effects around the center axis M are possible.

It is also possible not to arrange the slots in pairs or not exclusively in pairs, but in different numbers. As shown in FIG. 10*e*, a total of six slots 50 are here provided for the fuel, while only three slots 48 are provided for the oxidant.

In FIG. 10*f*, three slots are used for the fuel and six slots for the oxidant.

FIG. 11 shows an alternative design of the injector according to the first embodiment. The same reference numerals are used for the components known from the first embodiment, and in this respect, reference is made to the above explanations.

The injector of FIG. 11 corresponds to the embodiment of FIGS. 2 to 7 in that here too, injection takes place directly into the combustion chamber from the narrowest cross-section of the injector.

The main difference to the injector of FIGS. 2 to 5, which has a plurality of discrete injection openings formed by the slots, is that in the injector of FIG. 11, a continuous annular gap is provided for both the fuel and the oxidant. This annular gap is formed by the combustion chamber-side end of a hollow cylindrical portion 34 of the setting element 20, which together with the associated valve seat surfaces in the part 10 of the base body and the guide 18 defines the respective injection cross-section.

In the injector of FIG. 11, a two-phase choked flow is also present in the narrowest flow cross-section, i.e. at the outlet of the fuel and the oxidant into the combustion chamber. The narrowest cross-section which here coincides with the injection opening is here respectively marked with E.

FIG. 12 shows an injector according to a second embodiment. The same reference numerals are used for the components known from the first embodiment, and in this respect, reference is made to the above explanations.

The main difference between the injector of the first embodiment and that of the second embodiment is that the injector of the second embodiment is designed for liquids the vapor pressure of which is below the pressure in the combustion chamber. Examples are liquid oxygen, hydrogen peroxide, methane, liquid hydrogen and ethanol.

As the vapor pressure of these liquids is below the combustion chamber pressure, injection cannot be realized directly from the cavitation venturis 70, 103. Therefore, a pressure recovery portion 72 for the fuel and a pressure recovery portion 74 for the oxidant are provided downstream of the cavitation venturi, which is designated with reference numeral 70 in FIG. 12. In the pressure recovery portions 72, 74, the fluid is decelerated again by a continuous increase in the flow section, so that the pressure rises back to the combustion chamber level.

The fuel and the oxidant can then be injected downstream of the pressure recovery portion 74. The injection openings, which do not coincide with the narrowest cross-section here, are designated 102, 103.

The injector is configured here as a "pintle injector". The injection pattern can be adjusted and influenced here using generally known features, for example grooves in the nozzle plate.

FIGS. 13*a* to 13*c* show the injector of FIG. 12, a specific, flow-optimized geometry being shown here instead of the pressure recovery portion 72, 74, which is shown in FIG. 12 in a very schematic way.

Figure 13:
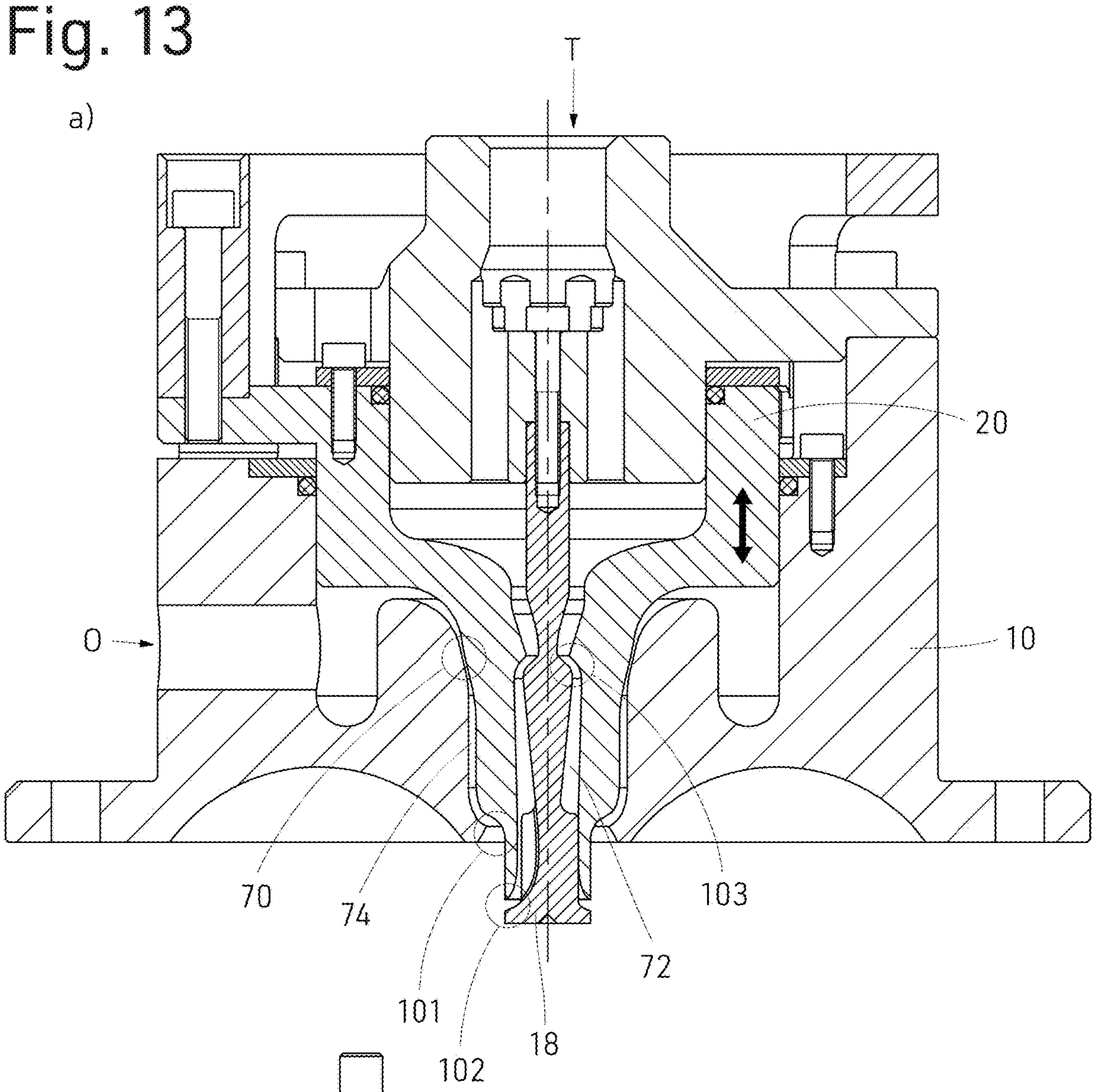
Figure 13:
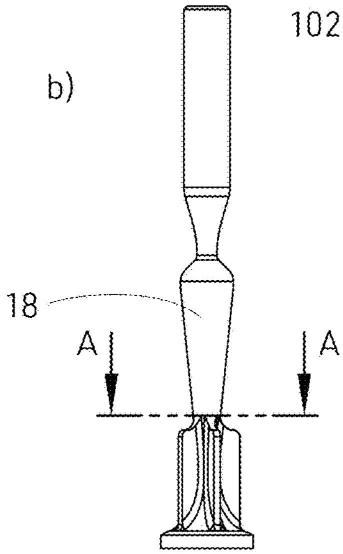
Figure 13:
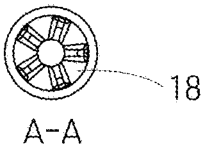

Here, too, the injector is controlled solely by the axial adjustment of the setting element 20 by means of the actuator 3 (shown schematically in FIG. 13). The only controlled parameter is the mass flow, which depends only on the flow cross-section in the cavitation venturi 70.

For the sake of completeness, the requirements which have to be met without exception, such that a cavitation state can be produced in an injector geometry with fluids the vapor pressure of which is lower than the combustion chamber pressure, are summarized below:

- There must be a narrowest point having a flow cross-section which is smaller than the injection opening.
- There must be a pressure recovery portion/diffuser behind the narrowest point. The pressure recovery must be sufficiently efficient for successful cavitation operation.
- Without a correctly dimensioned pressure recovery, cavitation operation cannot be achieved.
- The flow cross-section at the narrowest point must be sufficiently small so that, at a given pressure drop and a given size of the injection opening and a required injection speed or required mass flow, the static pressure at the narrowest point falls below the vapor pressure. If the cross-sectional area is too large or the pressure difference too low, normal flow without cavitation will be produced.
- The pressure ratio between the combustion chamber and the supply line must be above a critical ratio. This critical ratio is determined by the ratio of the cross-sections of the injection opening and the cavitation opening, and by the friction and swirling losses generated in the injector (especially in the pressure recovery portion). If the pressure losses are too high, the required pressure ratio increases to unrealistically high values. Good pressure recovery and fluid dynamic optimization is therefore a precondition for an operational design. If the pressure drop is too high, normal flow will take place instead of a cavitation operation.

The narrowest point must be configured to be sufficiently long, as evaporation of the fluid only occurs after a certain delay (boiling delay). This can be accelerated to a certain extent by lowering the pressure to a value below the vapor pressure. This also applies to fluids which are injected under cavitation and have a vapor pressure which is greater than the combustion chamber pressure.

FIGS. 14 to 16 show an injector according to a further embodiment. In its basic design, the injector corresponds to the injector known from FIGS. 1 to 7. The reference numerals known from the injector of FIGS. 1 to 7 are used, and in this respect, reference is made to the above explanations.

A difference between the embodiment of FIGS. 1 to 7 and the embodiment of FIGS. 14 to 16 is that the guide 18 ("pintle") is configured as a single piece here and is screwed in the part 12 of the base body 10, 12. The outer surface of the guide 18 forms a radially inner guide surface 25.

The pintle 18 is screwed in the part 12 of the base body 10, 12. The outer surface of the pintle 18 forms a radially inner guide surface 25.

On the side facing away from the combustion chamber, an outer conical sealing surface 44 and an inner conical sealing surface 46 adjoin the hollow cylindrical portion 34 of the setting element 20. Opposite these sealing surfaces, one groove (36 and 38) for the sealing rings 40 and 42 is respectively arranged in the base body 10 and in the pintle 18. When the setting element 20 is in the closed position, the seal 40 rests against a conical resting surface 44 of the part 20. When the setting element 20 is in the closed position, the seal 42 rests against a conical surface 46 formed on the setting element 20.

The radial sealing rings 107 and 108 seal the displaceable setting element 20 and the base bodies 10, 12 against the environment. Alternatively, the sealing rings 107 and 108 can be replaced by metallic bellows seals.

In summary, the injectors described are characterized by the following properties:

Considering the four controlled parameters total mass flow, mixture ratio, fuel injection speed and oxidant injection speed, only the total mass flow is varied during operation, while the remaining parameters can be fixed by suitable measures.

If the injector is in cavitation operation (2-phase choked flow) and the initial conditions are kept constant, all parameters are, in a first approximation, only linear functions of the geometry (flow cross-sections). Nonlinearities are present due to friction and swirling effects, but these have only a minor impact.

The correlation between the mass flow and the injection speed (and thus the cross-section of the cavitation venturi and the injection opening) are directly proportional in the first approximation. If the mass flow is halved, the injection cross-section must also be halved for a constant injection speed. Both parameters can thus be controlled by a single coupled parameter.

The injection speeds of the fuel and the oxidant can be controlled by a coupled parameter, as is common for variable area injectors.

This allows the entire control to be summarized in a single controlled parameter for mass flow monitoring. The injection speeds and the mixture ratio are determined by the geometry.

By a correct selection of the geometries, it is possible to construct a linear correlation between the thrust and the controlled variable. In combination with the pressure decoupling caused by cavitation, this represents a significant simplification of the control loop.

The injector is well suited for miniaturization (e.g. satellite engines) due to the lower demands on the size of the flow opening.

In the first embodiment, the setting element runs on an resting and sealed guide on the inside and on the outside; the fuel and the oxidant are present on the inside or the outside. If the setting element is displaced so far that the slots extend beyond the guide, the fuels can enter the combustion chamber through the opening that is formed. Both components then meet (similar to the classic impingement design) and are atomized. The injection openings increase proportionally to the travelling distance of the setting element. The mixture ratio is determined by the slot widths. Scaling is easily possible during production by adding or removing slot pairs.

Face shutoff is possible by integrating valves directly into the injector geometry.

To improve the face shutoff characteristics, soft seal packings are installed close to the injection openings. This improves the seal over longer periods of time. This is particularly relevant for use as a satellite engine.

The invention claimed is:

1. An injector for a rocket engine, comprising:

a base body, wherein a fuel supply and an oxidant supply are provided in the base body, and a setting element which, in cooperation with the base body, defines a first throttle point in the fuel supply, a second throttle point in the oxidant supply, and respective injection openings for fuel and oxidant, wherein the setting element is adjustable relative to the base body and wherein the first and second throttle points are configured such that, during operation, a fuel and an oxidant each flow through the narrowest cross-section of the respective first and second throttle points at the speed of sound, wherein the first and second throttle points coincide with the respective injection openings, wherein the setting element comprises, at an injection end of the setting element corresponding with the respective injection openings, a hollow cylindrical portion provided with slots arranged in pairs, the slots defining each of the respective injection openings for fuel and oxidant.

2. The injector of claim 1, wherein the hollow cylindrical portion is guided within the base body, preferably by means of a seal.

3. The injector of claim 1, wherein the setting element is provided with seals which are adapted to cooperate with a resting surface in the base body in an axial direction such that the fuel supply and the oxidant supply are shut off when the seals contact the resting surface.

4. A rocket engine, comprising a combustion chamber; and an injector comprising:

a base body, wherein a fuel supply and an oxidant supply are provided in the base body, and a setting element which, in cooperation with the base body, defines a first throttle point in the fuel supply and a second throttle point in the oxidant supply, and respective injection openings for fuel and oxidant, wherein the setting element is adjustable relative to the base body and wherein the first and second throttle points are configured such that, during operation, a fuel and an oxidant each flow through the narrowest cross-section of the respective first and second throttle points at the speed of sound, and further having a combustion chamber, wherein the first and second throttle points coincide with the respective injection openings, wherein the setting element comprises, at an injection end of the setting element corresponding with the respective injection openings, a hollow cylindrical portion provided with slots arranged in pairs, the slots defining each of the respective injection openings for fuel and oxidant.

5. The rocket engine of claim 4, wherein some of the fuel and/or oxidant injected into the combustion chamber impinges on a wall of the combustion chamber to cool the wall.

* * * * *